Sept. 22, 1964     B. G. HOWELL     3,150,220
METHOD OF MAKING APPLICATOR-TYPE CONTAINERS
Filed April 20, 1962     2 Sheets—Sheet 1
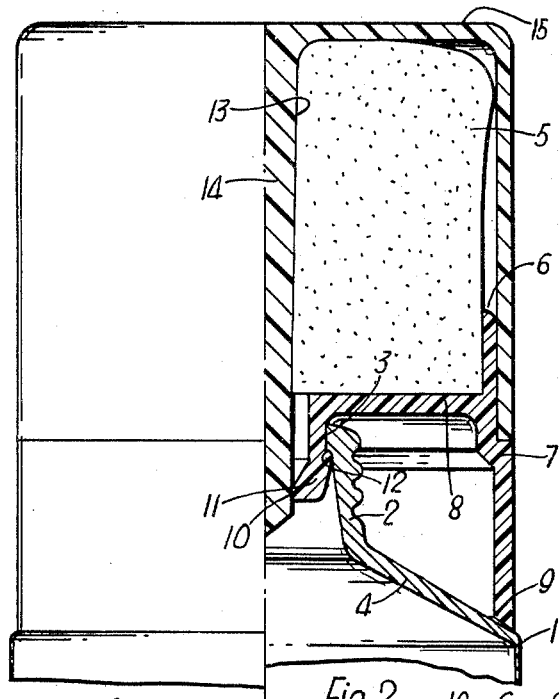
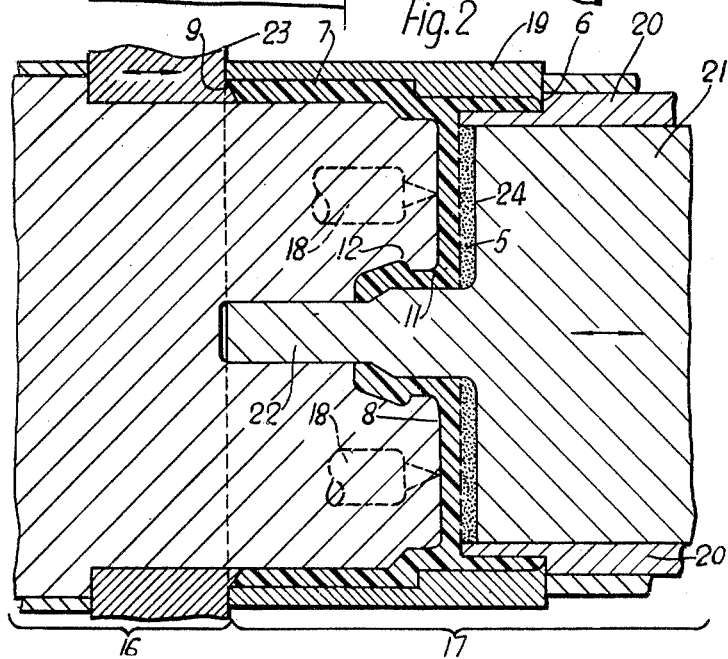
*Inventor*
BRYAN G. HOWELL
By Murrie and Smiley
*Attorneys*

Sept. 22, 1964  B. G. HOWELL  3,150,220
METHOD OF MAKING APPLICATOR-TYPE CONTAINERS
Filed April 20, 1962  2 Sheets-Sheet 2
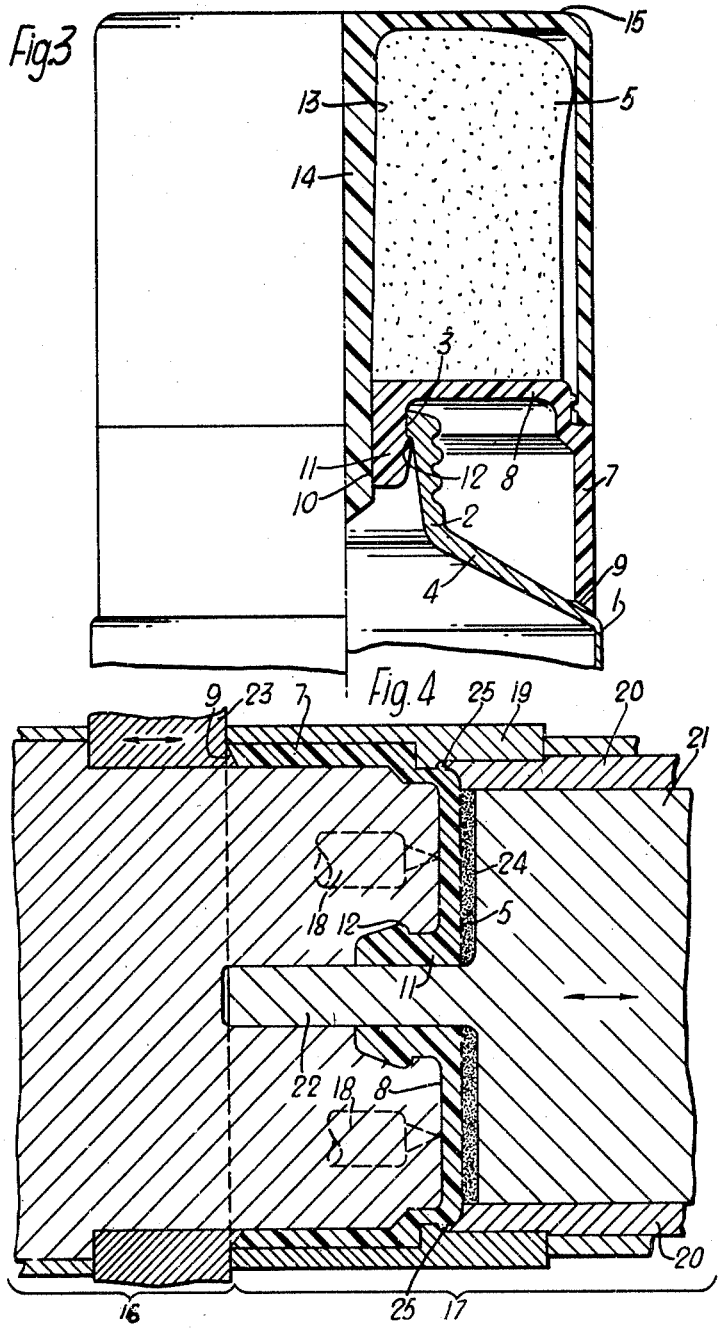
Inventor
BRYAN G. HOWELL
By Laurie and Finley
Attorneys United States Patent Office 3,150,220
Patented Sept. 22, 1964

3,150,220
METHOD OF MAKING APPLICATOR-TYPE
CONTAINERS
Bryan Gordon Howell, Alperton, Middlesex, England,
assignor to The Metal Box Company Limited, London,
England, a British company
Filed Apr. 20, 1962, Ser. No. 189,198
Claims priority, application Great Britain May 18, 1961
5 Claims. (Cl. 264—259)

A non-elected portion of this invention relates to applicator type containers for flowable materials such as liquids or creams and which is of the kind which comprises an applicator in the form of a pad one end face of which is secured to an element integral with the container or with a holder arranged to be fitted to a container and which has an aperture through which flowable material can pass from the container for spreading by the pad.

In an applicator of the kind described above it is usual for the pad to be secured, at least in part, by an adhesive. The securing of the pad by the use of adhesive renders it difficult to effect fitting of the pad to said element by automatic means and it is an object of the present invention to provide an applicator of the kind described in which the pad can be secured in position automatically and without the use of adhesives. A further object of the non-elected portion of the invention is to provide an applicator for fitment to a container in a manner such that the applicator is rigidly located in position and can be removed from the container only with considerable difficulty.

According to the non-elected portion of the invention there is provided an applicator for flowable materials such as liquids or creams comprising a pad one face of which is secured to an element integral with a container for the material or with a holder arranged to be fitted to the container, and which has an aperture through which flowable material can pass from the container for spreading by the pad, wherein said element is made by an injection moulding process from synthetic thermoplastic material and wherein the pad is made from a material capable of withstanding the process by which the thermoplastic material is moulded and has said one face thereof secured to the element by contact therewith during the moulding thereof.

In one embodiment of the non-elected portion of the invention said element comprises a transverse wall extending across and integral with an annular holder made from a flexible synthetic thermoplastic material, said wall being provided with an annular stem which extends therefrom for co-operation with a delivery opening formed in an end wall portion of an annular neck of a container to retain the holder in position relative to the container, the stem communicating with said aperture.

The preferred portion of the invention comprehends the method of manufacturing an applicator by compressing a pad axially in the cavity of a moulding tool, shielding the longitudinal edges of the pad against engagement with molten synthetic thermoplastic material during formation of the applicator, and injecting molten thermoplastic material into the mould cavity from a plurality of positions offset from the axis of the pad towards and against an end face of the compressed pad.

In order that the invention may be clearly understood two embodiments thereof will now be described by way of example with reference to the accompanying drawings, in which:

FIG. 1 illustrates, partly in section, an applicator according to the invention and fitted to a container, FIG. 2 illustrates a method of manufacturing the applicator, FIG. 3 is a view, similar to FIG. 1, of a modified form of applicator, and FIG. 4 is a view, similar to FIG. 2, illustrating the method of manufacturing the applicator shown in FIG. 3.

In the drawings like reference numerals refer to like or similar parts.

Referring to the drawings, the container, FIG. 1, is illustrated as being a collapsible tube having a body 1 formed, for example, from extruded aluminium. It is, however, to be understood that, if desired, the container may be of a kind other than a collapsible tube and it may be made from extruded synthetic thermoplastic material.

The container, FIG. 1, is provided with an annular neck 2 having a delivery opening 3 formed in an end wall portion of the neck and the neck is connected to the container body 1 by a shoulder 4 which forms an acute angle with the axis of the container.

The applicator for attachment to the container comprises an applicator pad 5 which is made of any suitable material which will withstand the process by which a holder, described below, is injection moulded, but which is preferably made of artificial sponge material, whether the material be intercellular or non-intercellular, for example the pad is made of polyurethane foam. The pad 5 projects beyond the outer end 6 of an annular holder 7 which is injection moulded from a synthetic thermoplastic material, for example from low density polyethylene, and one end face of the pad is secured to a transverse element shown as a wall 8 which extends across and is integral with the annular holder 7. As shown in FIG. 1, the wall 8 is located between the outer end 6 and the inner end 9 of the annular holder. An aperture 10 extends through the wall 8 and communicates with the interior of an annular stem 11 which extends from the transverse wall 8 towards the inner end 9 of the holder and which, as can be seen from the drawing, is arranged for co-operation with the delivery opening 3 to retain the holder 7 in position relative to the container. As shown in FIG. 1 the stem 11 is insertable through the delivery opening 3 to effect sealing engagement with the sides thereof. The stem 11 is provided with an external projection, or barb, 12 which is engageable beneath the end wall of the neck through which the delivery opening 3 extends. As illustrated in the drawings, the projection, or barb, 12 extends continuously round the stem 11 but, if desired, the projection may be formed by two or more shorter projections spaced apart one from the other around the stem and located in a single plane perpendicular to the axis of the stem. The rim 9 at the inner end of the holder is chamfered to engage the shoulder 4 of the container.

The pad 5 is provided with a hole 13 which extends therethrough in alignment with the aperture 10, and the hole 13 and aperture 10 are sealed by a plug 14 which extends therethrough and is integral with, or is secured to, a cap 15 arranged to enclose the pad and be fitted to the exterior of the holder 7.

The pad 5 is secured to the transverse wall 8 of the holder 7 but is not secured to the side portions of the outer end of the holder which surround it.

The method of manufacturing the applicator is illustrated in FIG. 2 and is effected by an injection moulding machine which, as is customary, comprises a fixed moulding tool 16 and an axially movable tool 17. The fixed tool includes a plurality of injection nozzles 18 offset from the axis thereof and the nozzles are preferably four in number. The movable tool comprises a die part 19, a shield 20, and a reciprocable piston or plunger 21 provided with a co-axial spigot 22. A stripper element 23 is also movable axially relative to the fixed tool 16.

At the commencement of operation the movable tool 17 is separated from the fixed tool 16 and the piston 21 is retracted within the shield 20. A pad 5 is placed within the shield 20 and the movable tool is moved into co-operation with the fixed tool as shown in the drawing. The piston 21 is then moved to the forward position thereof, that is the position shown in FIG. 2, so that the spigot 22 enters the hole 13 in the pad and the piston effects axial compression of the pad 5 against the end face of the fixed tool 16. Molten synthetic thermoplastic material is then injected through the nozzles 18 towards and against the end face of the compressed pad which is engaged with the tool 16 and the pressure exerted on the pad by the thermoplastic material causes further compression of the pad against the face 42 of piston 21 so that the molten material flows into the mould cavity and forms the annular holder 7. It will be seen that the longitudinal edges of the compressed pad are located within the shield 20 so that they are not engaged by the thermoplastic material which is caused to flow past them to form the outer end portion of the holder. Following completion of the moulding operation the movable part 17 of the mould is retracted together with piston 21 whereupon the pad 5 expands and projects beyond the outer end of the holder 7. The stripper element 23 is then moved, to the right as viewed in FIG. 2, to strip the holder from the fixed mould part 16. Due to the injection of the molten thermoplastic material against the end face of the pad 5 the latter is firmly secured to the transverse wall portion 8 of the holder.

FIG. 3 illustrates a modified form of applicator from which the outer end 6 has been omitted so that the pad 5 stands proud from the wall 8. In this embodiment of the invention aperture 10 is of constant diameter throughout the length of the stem 11 and the annular holder 7 is provided with small beads 25 by which the cap 15 is held in position.

FIG. 4 illustrates the method by which the applicator of FIG. 3 is manufactured, this method being as described above with reference to FIG. 2 except that the shape of die parts 19 and 20 are modified to accommodate the formation of the beads 25 and to omit the outer end 6, and the spigot 22 is of uniform diameter throughout its length.

In the foregoing description the applicator holder has been described as made from flexible thermoplastic material and this is because it is to be secured to a metal container by a projection, or barb, 12. If, however, the container is made of a flexible material the holder can be made as herein described but from a relatively rigid plastic material. Alternatively, if the spigot 11 is moulded with internal screw threads, instead of a projection 12, to be screwed on to the neck of a container, the holder may be injection moulded from a relatively rigid thermoplastic material.

Further, if desired, it may in some circumstances be found possible, using the manufacturing method above described, to secure the pad 5 directly to the end wall portion of the neck of a container thus avoiding the necessity of providing the pad on a separate holder to be fitted to the neck of the container.

I claim:

1. The method of manufacturing an applicator for flowable materials such as liquids or creams, by compressing a pad of artificial sponge axially in the cavity of a moulding tool shaped to define an annular holder for the pad, shielding the longitudinal edges of the pad against engagement with molten synthetic thermoplastic material during formation of the holder, and injecting molten thermoplastic material into the mould cavity from a plurality of positions offset from the axis of the pad towards and against an end face of the compressed pad thereby to permit adherence of the pad to the moulded holder on cooling thereof.

2. The method according to claim 1 in which the pad is made of polyurethane foam.

3. The method according to claim 2 in which the thermoplastic material is a flexible material.

4. The method according to claim 3 in which the thermoplastic material is polyethylene.

5. The method of manufacturing an applicator for flowable materials such as liquids or creams, by compressing a pad of artificial sponge axially in the cavity of a moulding tool shaped to define a container having an annular neck an end wall portion of which is provided with a delivery opening, shielding the longitudinal edges of the pad against engagement with molten synthetic thermoplastic material during formation of the container, and injecting molten thermoplastic material into the mould cavity from a plurality of positions offset from the axis of the pad towards and against an end face of the compressed pad whereby on cooling of the moulded container the pad is adhered to the outer side of said end wall.

References Cited in the file of this patent
UNITED STATES PATENTS
2,962,743 Henriksson _____ Dec. 6, 1960